United States Patent
Gleize et al.

(10) Patent No.: US 12,468,852 B2
(45) Date of Patent: Nov. 11, 2025

(54) DATA ANONYMITY PROTECTOR

(71) Applicant: INTERNATIONAL BUSINESS MACHINES CORPORATION, Armonk, NY (US)

(72) Inventors: Martin Gleize, Dublin (IE); Pierpaolo Tommasi, Dublin (IE); Yufang Hou, Dublin (IE); Debasis Ganguly, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 17/653,817

(22) Filed: Mar. 7, 2022

(65) Prior Publication Data
US 2023/0281340 A1 Sep. 7, 2023

(51) Int. Cl.
*G06F 21/62* (2013.01)
*G06F 21/31* (2013.01)
*G06N 20/00* (2019.01)

(52) U.S. Cl.
CPC .......... *G06F 21/6263* (2013.01); *G06F 21/31* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 8,166,313 B2 | 4/2012 | Fedtke | |
| 8,649,552 B2 | 2/2014 | Balakrishnan | |
| 10,026,021 B2 | 7/2018 | Stoop et al. | |
| 10,140,321 B2 | 11/2018 | Hakkani-Tur | |
| 10,387,511 B2 | 8/2019 | Evnine | |
| 2007/0266079 A1* | 11/2007 | Criddle | G06Q 10/107 709/203 |
| 2010/0318489 A1* | 12/2010 | De Barros | G06N 5/04 706/50 |
| 2015/0213288 A1* | 7/2015 | Bilodeau | G06F 21/6254 726/26 |
| 2017/0243162 A1* | 8/2017 | Gavrielides | G06F 16/273 |
| 2017/0262477 A1* | 9/2017 | Carroll | G06F 16/51 |

(Continued)

OTHER PUBLICATIONS

Amreen, Sadika, "Methods of Disambiguating and De-anonymizing Authorship in Large Scale Operational Data", PhD dissertation, University of Tennessee, 2019, https://trace.tennessee.edu/utk_graddiss/5453 (130 pages).

(Continued)

*Primary Examiner* — Atta Khan
(74) *Attorney, Agent, or Firm* — Edward J. Wixted, III

(57) ABSTRACT

Embodiments for providing enhanced data anonymity protection by a processor are disclosed. Selected portions of data intended for distribution in a communication channel or currently distributed on one or more data sources having a potential for revealing identify of a user in a public domain (and/or private domain) may be identified, where an assessment is provided indicating a current status of an amount of data currently exposing the identity of the user in the public domain. The selected portions of the data may be transformed into anonymous data by applying a one or more data corrective operations to prevent further exposure of the identity of the user into the public domain.

18 Claims, 10 Drawing Sheets

(56) References Cited

U.S. PATENT DOCUMENTS

2019/0222602 A1* 7/2019 Linder .............. G06F 16/24578

OTHER PUBLICATIONS

Umair, Amber, "Machine Learning based Information Forensics from Smart Sources", Thesis, University of Technology Sydney, Australia, 2007, (118 pages).

Metcalf et al., "Where are human subjects in Big Data research? The emerging ethics divide", Research article, Big Data & Society, May 2016, DOI: 10.1177/2053951716650211, (14 pages).

Chen, Zhipeng, "Inferencing User Characteristics and Behaviors from Social Media with Applications in Regulatory Science", Electronic Dissertation, The University of Arizona, Jul. 2021, http://hdl.handle.net/10150/645784 (166 pages).

Breidbach et al., "Accountable algorithms? The ethical implications of data-driven business models", Journal of Service Management, vol. 31, pp. 163-185, May 2020, DOI:10.1108/JOSM-03-2019-0073, (23 pages).

Garcia-Pablos, et. al., "Sensitive Data Detection and Classification in Spanish Clinical Text: Experiments with BERT", https://www.aclweb.org/anthology/2020.lrec-1.552.pdf, Proceedings of the 12th Conference on Language Resources and Evaluation (LREC 2020), pp. 4486-4494, Marseille, May 11-16, 2020, c European Language Resources. Association (ELRA), licensed under CC-BY-NC.

Ghazinour, et. al., "Detecting Health-Related Privacy Leaks in Social Networks Using Text Mining Tools", https://link.springer.com/chapter/10.1007/978-3-642-38457-8_3, O. Zaïane and S. Zilles (Eds.): Canadian AI 2013, LNAI 7884, pp. 25-39, 2013. © Springer-Verlag Berlin Heidelberg 2013, Accessed Jan. 19, 2024.

Xu, et. al., "Personal Information Leakage Detection in Conversations", https://aclanthology.org/2020.emnlp-main.532/, Proceedings of the 2020 Conference on Empirical Methods in Natural Language Processing, pp. 6567-6580, Nov. 16-20, 2020, c 2020 Association for Computational Linguistics.

* cited by examiner

DATA ANONYMITY PROTECTOR

BACKGROUND

The present disclosure relates in general to computing systems, and more particularly, to various embodiments for providing enhanced data anonymity protection in a computing environment using a computing processor.

SUMMARY

According to an embodiment of the present disclosure, a method for providing enhanced data anonymity protection in a computing environment, by one or more processors, is depicted. Selected portions of data intended for distribution in a communication channel or currently distributed on one or more data sources having a potential for revealing identify of a user in a public domain (or optionally a private domain) may be identified, where an assessment is provided indicating a current status of an amount of data currently exposing the identity of the user in the public domain (or optionally a private domain or both the private and public domain). The selected portions of the data may be transformed into anonymous data by applying a one or more data corrective operations to prevent further exposure of the identity of the user into the public domain.

An embodiment includes a computer usable program product. The computer-usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

DETAILED DESCRIPTION OF THE DRAWINGS

Figure 1:
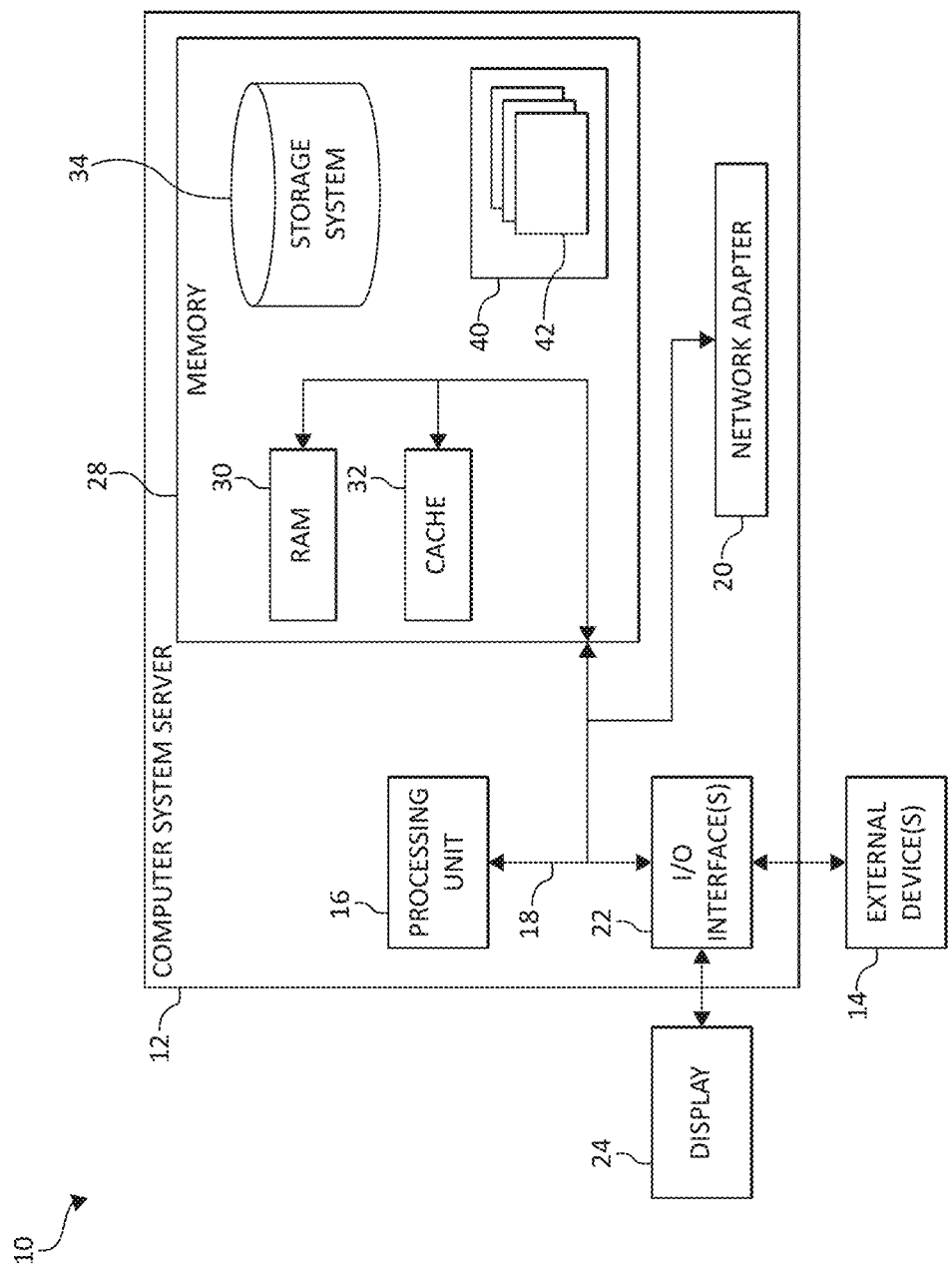
FIG. 1 is a block diagram depicting an exemplary cloud computing node according to an embodiment of the present disclosure.

In recent years, people have been witnessing a data explosion, with data being estimated in the order of zettabytes. Analyzing this wealth and volume of data offers remarkable opportunities for growth in various industries and sectors (of types of entities (e.g., companies, governments, academic institutions, organizations, etc.). However, the majority of these datasets (e.g., healthcare data, telecommunication data, banking data, etc.) may be proprietary or private and include personal (e.g., personally identifiable information "PII") and/or business-sensitive information. Examples of sensitive data include personal identification information (e.g., age), patient records, special housing information, tax records, governmental issued identification numbers (e.g., social security number), banking/financial data numbers (e.g., a bank account number, credit/debit card numbers, etc.), customer purchase records, academic records, mobile call detail records (CDR), etc. This type of data is often considered as private and confidential and should be protected from access by unauthorized users.

Additionally, social media has become an important means of communication in our modern world. For example, many people have one or more social media accounts, allowing them to post messages to a large number of people at one time. While some social media allows communicating with other users, there remains risks to the user when the user reveals information pertaining to classified, private, personal, sensitive, confidential, and/or proprietary data such as, for example, discrimination, harassing, or other negative, unwanted, or unsolicited behavior directed to the users.

Additionally, data leakages of certain types of data (e.g., classified, private, sensitive, confidential, and/or proprietary data) may be due to unintended human error (e.g., communicated data). Several approaches have been taken to address the issue, mainly through access control or encryption, hence by restricting who can access specific messages and training, hence trying to better educate users relating to the type of data eligible for sharing or disclosure to $3^{rd}$ parties.

However, such efforts are still insufficient to protect the leakage of a selected type of data, such as, for example, intentionally or unintentionally disclosing personal data (intended to remain private), passwords, confidential files, or other types of protected shared/published in public channels. Thus, the present disclosure provides for preventing disclosure of confidential data in a computing environment by a processor. That is, the present disclosure provides for assisting a user to control the personally identifiable information they unveil publicly, remain anonymous on a social network, and provide advice on how to publish data to various social media platforms (or other public shared database/website) to preserve anonymity or certain personally identifiable information.

In some implementations, the present disclosure provides for enhanced data anonymity protection. Selected portions of data intended for distribution in a communication channel or currently distributed on one or more data sources having a potential for revealing identify of a user in a public domain (or optionally a private domain or both the private and public domain) may be identified, where an assessment is provided indicating a current status of an amount of data currently exposing the identity of the user in the public domain (or optionally the private domain or both the private and public domain). The selected portions of the data may be transformed into anonymous data by applying a one or more data corrective operations to prevent further exposure of the identity of the user into the public domain (or optionally the private domain or both the private and public domain).

In other implementations, the present disclosure provides for ingesting all known data about the user publicly (e.g., social networks, blogs, websites, services, etc.) and optionally privately (e.g., data provided by the user themselves), analyzes all of this known data, and (1) provides the user with an assessment of the current status of Personal Information (PI) exposed online (e.g., in a public or private domain), and/or (2) offers corrective measures to help the user prevent further PI leakage, optionally collecting feedback from the user in both scenarios.

In other implementations, the present disclosure may analyze a user's profile, social media publishing/posting history, language patterns, and contacts for personal information ("PI") leakage. In one aspect, the personal information ("PI") may include, but is not limited to, name, gender, age, ethnicity, profession, location, etc. The present disclosure may also use one or more machine learning/artificial intelligent operations to be personalized for the user's profile. One or more insights or warnings may be provided to the user relating to information the user releases publicly. The present disclosure may also highlight the user-specific language patterns and provides a risk assessment (e.g., a risk assessment ranking or percentage of the amount of risk) of possible PI leakage and/or of being identified online by contact profile types (e.g., fully anonymous to a stranger, not localizable to an identified or approved associate (e.g., friend or family member). One or more modifications/changes to the user's profile may be dynamically adjusted. Also, historical published data (e.g., prior social media posts/communications) may be adjusted and/or edited. Additionally, one or more portions of current or in-progress social media posts/communications may also be adjusted, edited, and/or anonymized, to increase PI protection and lower the risk of being identified online.

To further illustrate, consider the following example. In a first example, assume there have been three posts posted on a publicly available platform (e.g., a social media platform) an account with a user's name of "Anonymous9182." On this account, assume the posts indicate that "I'm a data scientist and let me tell you the job market is really great right now.", "As a native citizen of country A, I find this really interesting!", "I like working for company B, but don't like my job." Individually these three social media posts do not reveal too much about this person but combined may reveal sufficient data about the user that may ultimately reveal the user's identity, which was never the intended goal of the user. Thus, using one or more implementations of the present disclosure, the present disclosure may select/highlight sections or portions of the communication that may reveal potentially personal information such as, for example, "data scientist," "country A," "Company B."

The present disclosure may reveal or provide valuable insight to the user from gathering data from one or more data sources such as, for example, a message to the user that state "there are only 12 people pointed to by these elements" and provides advice on edits to maintain more anonymity such as, for example, change "data scientist" to "scientist" and change "native of country A" to say I speak the language of country A, and/or even change "company B" to "a large computer." In this way, previous or current communications may be adjusted, altered, or anonymized to maintain a level of privacy and security desired by the user.

Thus, the present invention may execute/operate in two different stages. First, the present disclosure may provide an assessment of current status (even offline, if the data is available) and provide an assessment, based on the current status, of in-progress content (e.g., a communication/posting on a social media platform). In one implementation, the personal information may include data of a user that includes likes/tastes and/or dislikes such as, for example, a taste, like, or preference for certain video games, which may lead to cyberbullying or a taste, like, or preference for colors that may cause the user to become more identifiable. The personal information may also include favorite activities and/or hobbies such as, for example, hiking, cross-fitting or knitting, political/religious opinions. Thus, personal information may be any data that may lead to a range of negative consequences (e.g., bullying, discrimination, home identification, attacks/threats, etc.). In one aspect, the personal information may be learned or identified using feedback data, data from third-party data sources, or other resources that may learn and train a machine learning model to identify data that may generate negative consequences or negative action towards the user.

Thus, the present disclosure may also inspect data prior to publication or previously published to communication channel/platform. Selected portions of the data may be identified and anonymized. The selected portions of the data may also be filtered or anonymized according to a degree of risk assessment defined in one or more publishing policies, rules, or machine learning models prior to sending the data to the communication channel/platform.

In an additional aspect, the present disclosure provides for preventing selected types of data information (e.g., sensitive, classified, confidential, protected, etc.) from being shared, disclosed, and/or published in a public channel. One or more operations for data and/or document type identification, classification, de-identification, and anonymization to ensure required security and privacy are provided herein. For example, a message (e.g., social media post) along with one or more associated files may be temporarily suspended for identification prior to being published/shared in the public channel. The message and/or file may be highlighted, edited, and/or anonymized if the message (e.g., social media post) and/or files are detected as potentially generating negative consequences or negative action towards the user and/or violate one or more publishing/security and/or privacy rules. Optionally, mechanisms of the illustrated embodiments may be added to one or more alternative computing systems used to deliver messages in order to filter the recipients of the messages according to the semantics detected in the message content. Thus, the present disclosure may employ the operations described herein for preventing leakage of selected information in public channels independently of any alternative underlying computing implementation.

In one aspect, mechanisms of the illustrated embodiments may inspect the data prior to being communicated to a public channel to ensure that it may potentially generate negative consequences or negative action towards the user is released (e.g., leaked).

In an additional aspect, the present disclosure may use and/or apply one or more data security rules, policies, machine learning models, and/or requirements upon receiving and analyzing user input data to prevent publication/sharing of data/raw data (e.g., classified/private data).

In one aspect, if the classified/private data is detected, the present disclosure filters the classified/private data (e.g., sensitive information) and/or replaces the classified/private data with non-classified/non-private data (e.g., non-sensitive information). That is, a machine-learning operation may perform one or more machine learning operations (e.g., natural language processing and/or artificial intelligence "AI" operations) to learn data that may be determined to be classified (e.g., private, personal, sensitive, and/or proprietary). The selected portion of data that is determined to be classified/private data may be filtered and/or anonymized.

In an additional aspect, present disclosure may ingest all known data about a user publicly (e.g., social networks, blogs, websites, services, etc.) and optionally privately (data provided by the user themselves), analyze the data. The present disclosure may (1) provide a user with an assessment of the current status of Personal Information (PI) exposed online, and/or (2) offer corrective measures to help the user prevent further PI leakage, and 3) may collect feedback from the user in both scenarios.

The present disclosure may analyze a user's public data (e.g., profile, posts, contacts, blogs, websites, services) and private data and provide a report/assessment of the user's personal information being revealed/leaked by said posts/accounts. Also, for any content being created (e.g., new post, text, image, audio, video, etc.), the present disclosure may provide a breakdown of the content for potential PI leakage (e.g., which portion of text exposes PI data based on user already available content online).

In general, as used herein, "optimize" may refer to and/or be defined as "maximize," "minimize," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations and/or machine learning models/machine learning pipelines, but there may be a variety of factors that may result in the alternate suggestion of a combination of operations and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result, such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description of cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the disclosure.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
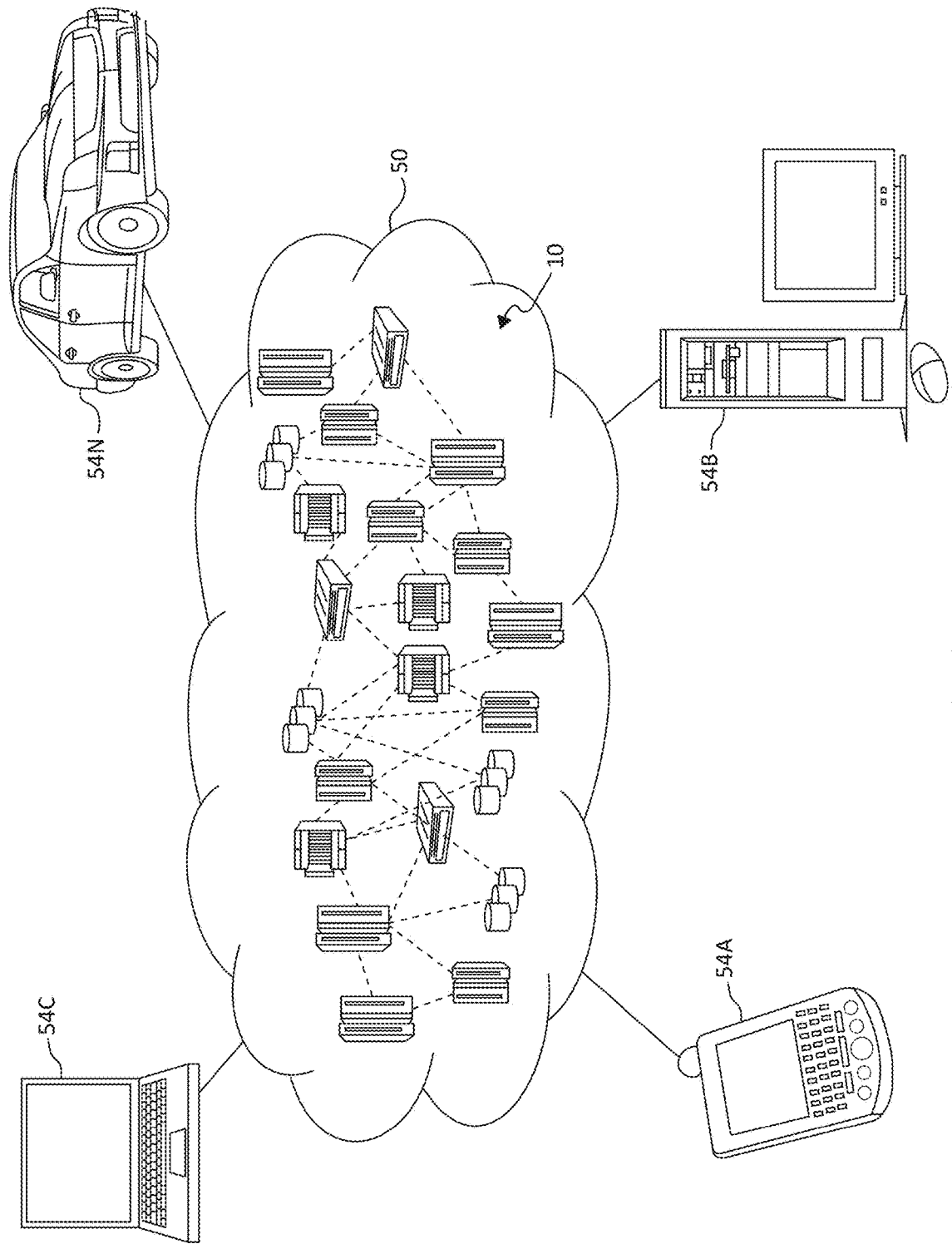
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
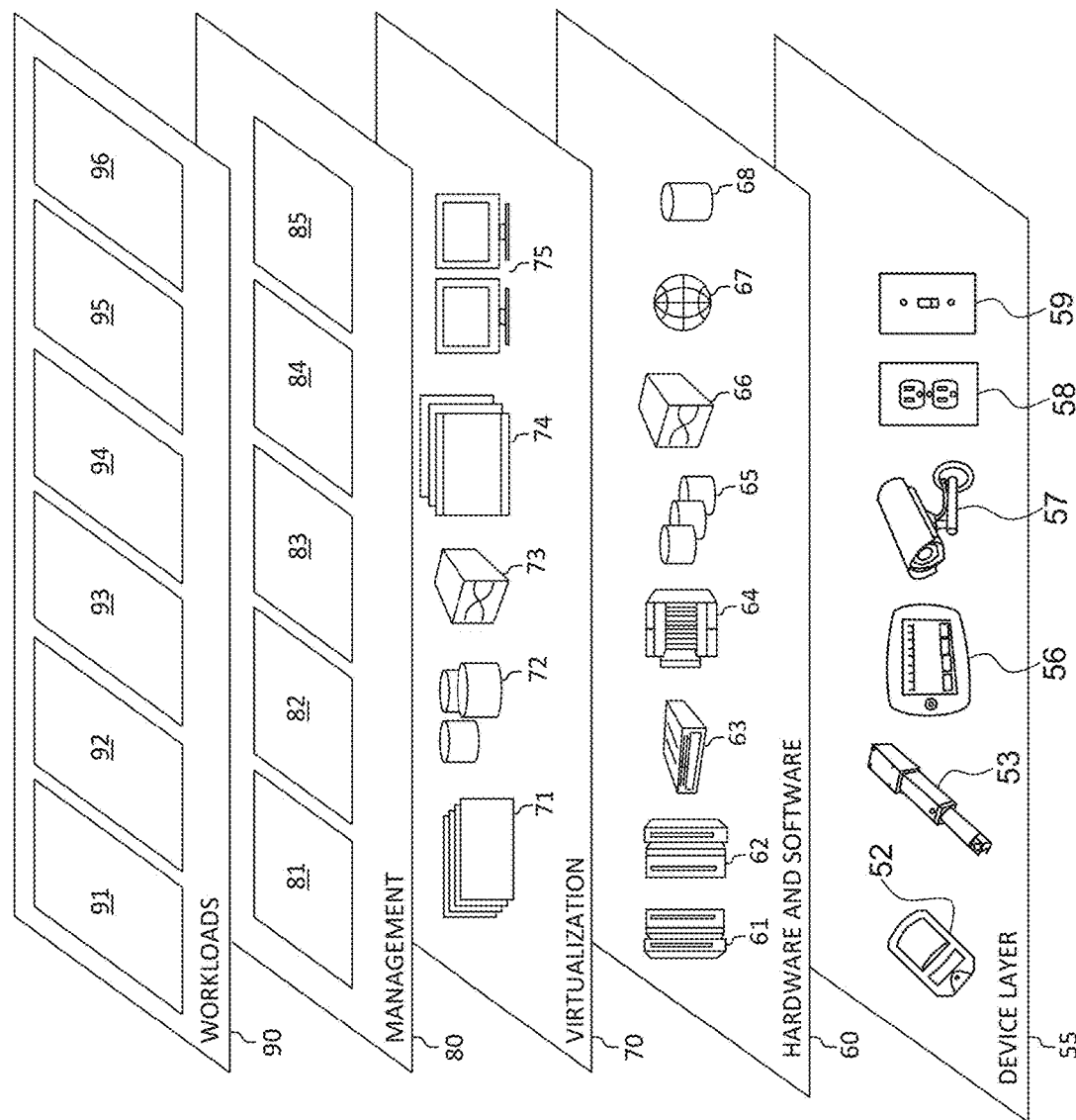
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present disclosure, various workloads and functions 96 for providing enhanced data anonymity protection in a computing environment (e.g., in a neural network architecture). In addition, workloads and functions 96 for providing enhanced data anonymity protection in a computing environment may include such operations as analytics, deep learning, and as will be further described, user and device management functions. One of ordinary skill in the art will appreciate that the workloads and functions 96 for providing enhanced data anonymity protection in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present disclosure.

Figure 4:
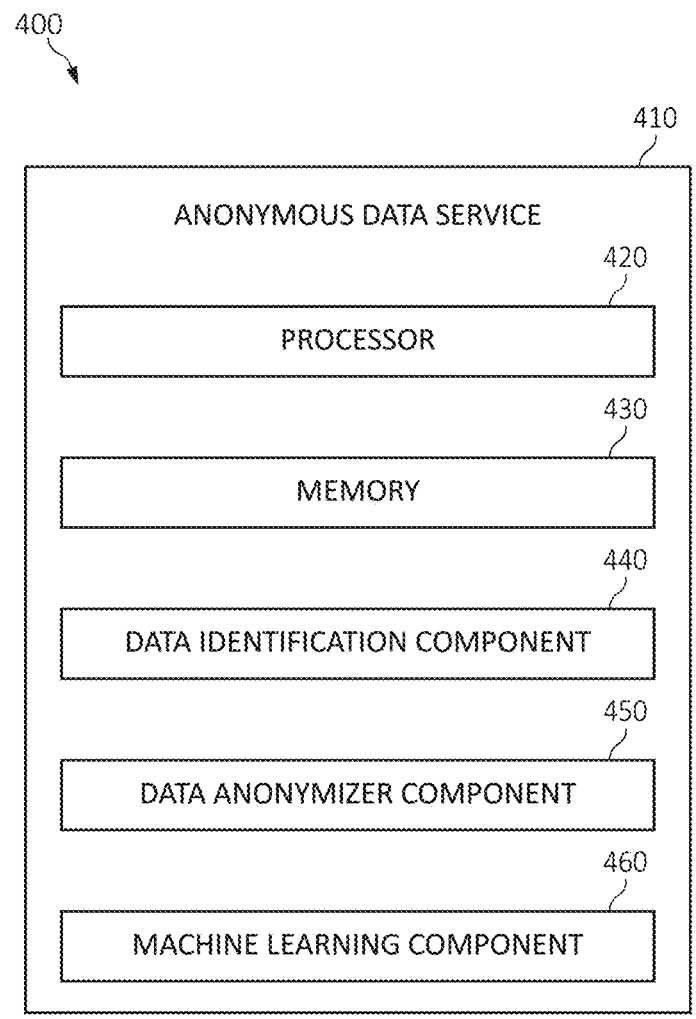
FIG. 4 is an additional block diagram depicting an exemplary functional relationship between various aspects of the present disclosure.

Turning now to FIG. 4, a block diagram depicting exemplary functional components of system 400 for implementing and providing memory access operations for large graph analytics in a computing environment according to various mechanisms of the illustrated embodiments is shown. In one aspect, one or more of the components, modules, services, applications, and/or functions described in FIGS. 1-3 may be used in FIG. 4. As will be seen, many of the functional blocks may also be considered "modules" or "components" of functionality, in the same descriptive sense as has been previously described in FIGS. 1-3.

Turning now to FIG. 4, a block diagram depicting exemplary functional components 400 for providing enhanced data anonymity protection according to various mechanisms of the illustrated embodiments, is shown. In one aspect, one or more of the components, modules, services, applications, and/or functions described in FIGS. 1-3 may be used in FIG. 4.

An anonymous data service 410 is shown, incorporating processing unit 420 to perform various computational, data processing, and other functionality in accordance with various aspects of the present disclosure. The processing unit 420 may be in communication with memory 430. The anonymous data service 410 may include a data identification component 440, a data anonymizer component 450, and a machine learning component 460. As one of ordinary skill in the art will appreciate, the depiction of the various functional units in anonymous data service 410 is for purposes of illustration, as the functional units may be located within an anonymous data service 410 or elsewhere within and/or between distributed computing components. It should be noted that the data identification component 440, the data anonymizer component 450, and the machine learning component 460 may each work in concert with processing unit 420 and memory 430 to accomplish various aspects of the present disclosure.

The data identification component 440 may include a data repository or database (e.g., a statistical database) accessible by the anonymous data service 410. The data identification component 440 may work in concert with processing unit 420 and memory 430 to accomplish various aspects of the present disclosure, such as, for example, enabling one or more datasets, fields of the datasets, or a cluster of datasets of one or more databases to be defined.

The data identification component 440, the data anonymizer component 450, and the machine learning component 460 may identify selected portions of data intended for distribution in a communication channel or currently distributed on one or more data sources having a potential for revealing identify of a user in a public domain, where an assessment is provided indicating a current status of an amount of data currently exposing the identity of the user in the public domain. The data identification component 440, the data anonymizer component 450, and the machine learning component 460 may transform the selected portions of the data into anonymous data by applying a one or more data corrective operations to prevent further exposure of the identity of the user into the public domain.

The data identification component 440, the data anonymizer component 450, and the machine learning component 460 may generate a report of the data indicating a potential for revealing the identity of the user based on the selected portions of data intended for distribution in the communication channel or currently distributed on the or more data sources.

The data identification component 440, the data anonymizer component 450, and the machine learning component 460 may indicate the selected portions of the data intended for distribution in the communication channel exposes the identity of the user.

The data identification component 440, the data anonymizer component 450, and the machine learning component 460 may identify the selected portion of the data reveals the identity of the user based on using a machine learning operation. That is, the data identification component 440, the data anonymizer component 450, and the machine learning component 460 may identify the selected portion of the data reveals the identity of the user based on using a knowledge graph (e.g., using a machine learning operation).

The data identification component 440, the data anonymizer component 450, and the machine learning component 460 may apply the one or more data corrective operations to the selected portion of the intended for distribution in the communication channel or currently distributed on the one or more data sources.

The machine learning component 460 may initiate a machine-learning operation to identify and learn all data, data attributes, and sensitive data associated with the user from prior communications to one or more communication channels, all data intended for distribution in the communication channel, and all data currently distributed on one or more data sources that expose the identity of the user. The machine learning component 460 may train one or more machine learning models to identify and transform the selected portions of data into anonymous data according to a user profile.

The machine learning component 490 may learn the various classified/private data (e.g., personal, sensitive, proprietary information) for each type of user and/or entity (e.g., government, business, organization, academic institution, etc.) and assist the knowledge manager 480 to identify, detect, analyze, and/or intercept classified/private data (e.g., personal, or sensitive information). In one aspect, the machine learning component 490 may include and/or access a knowledge domain that may include a variety of knowledge data such as, for example, data relating to the various classified/private data for each type of user and/or entity (e.g., government, business, organization, academic institution, etc.).

In one aspect, the various machine learning operations of the machine learning component 490, as described herein, may be performed using a wide variety of methods or combinations of methods, such as supervised learning, unsupervised learning, temporal difference learning, reinforcement learning, and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub-symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference, or other machine learning described in this paragraph are known and are within the scope of this disclosure. Also, when deploying one or more machine learning models, a computing device may be first tested in a controlled environment before being deployed in a public setting. Also, even when deployed in a public environment (e.g., external to the controlled testing environment), the computing devices may be monitored for compliance.

Figure 5:
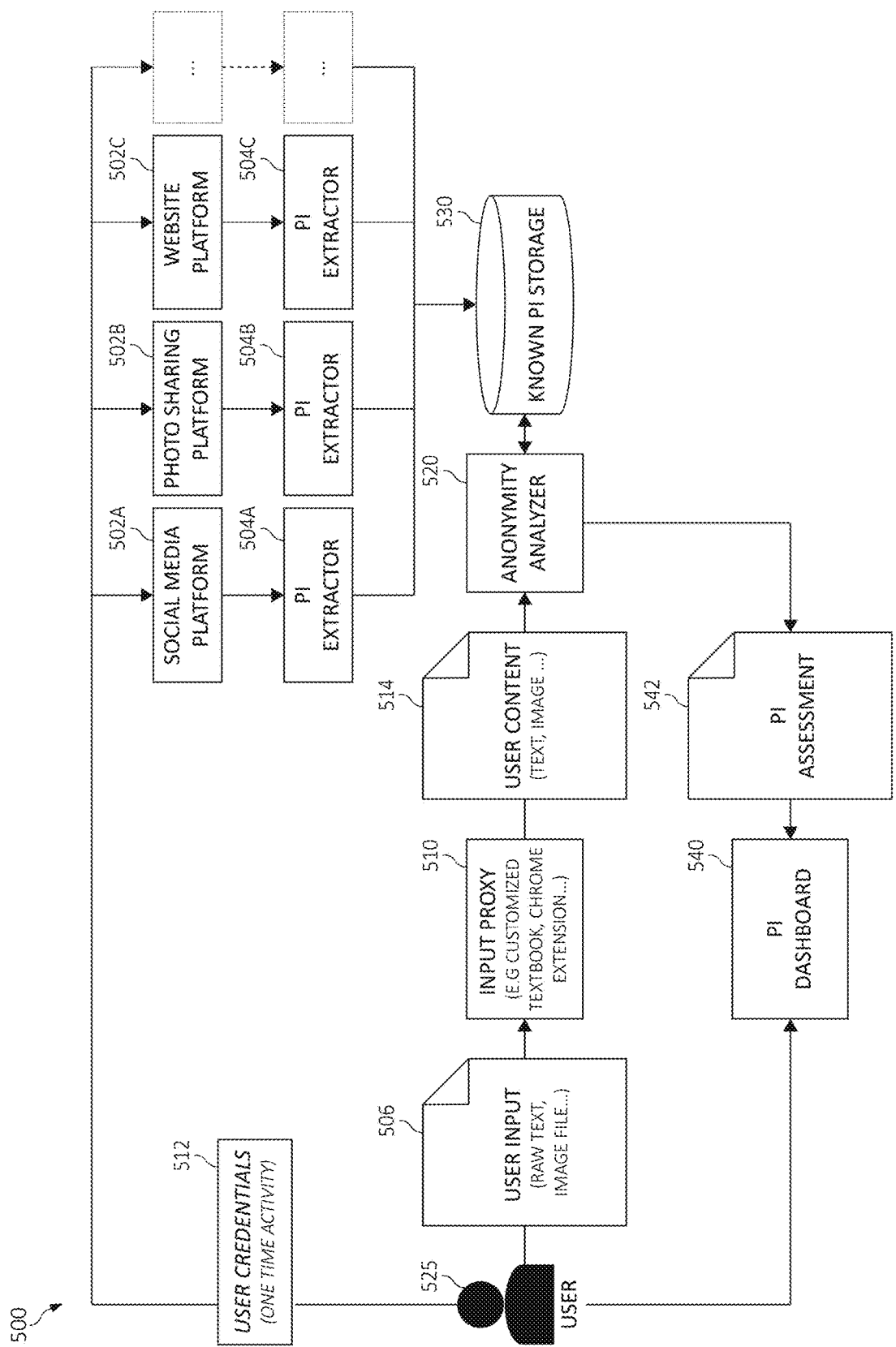
FIG. 5 depicts block flow diagram depicting operations for providing enhanced data anonymity protection in a computing environment according to an embodiment of the present disclosure.

For further explanation, FIG. 5 is an additional block diagram depicting operations of providing memory access operations for large graph analytics in which aspects of the present disclosure may be realized. In one aspect, one or more of the components, modules, services, applications, and/or functions described in FIGS. 1-4 may be used in FIG. 5. Repetitive description of like elements, components, modules, services, applications, and/or functions employed in other embodiments described herein is omitted for the sake of brevity.

As depicted, a user 525 may provide user credentials (e.g., a one-time activity) to one or more social media and/or website platforms such as, for example, system adapters 502A-D.

In one aspect, the adapter (e.g., social media/system adapter) such as, for example, system adapters 502A-D may be an adapter that is a parser for a specific social network (or any website or service that exposes user data). The system adapters 502A-D may be a dependency inversion made explicit in system architecture, and the role of the system adapters 502A-D is to expose data in a standardized way for a system. The system adapters 502A-D may receive private data.

In one aspect, the system adapters 502A-D may result in communication with one or more personal information ("PI") extractors such as for example, PI extractors 504A-C. The role of each of the PI extractors 504A-C is to extract personal information from all the content about the user 525. In one implementation, natural language processing ("NLP") operations may be performed for text content, image recognition for image content, and speech-to-text ("STT") operations with NLP operations for audio content.

The user 525 may also provide user input data 506 into an input proxy 510. The input proxy 510 may be a customized textbox, a search engine extension, or other means for receiving the user input 506. The input proxy 510 may process and analyze the user input 506 and then provide user content 514 to an anonymity analyzer 520.

In some implementations, the input proxy 510 may address multiple use cases rather than only text. That is, the input proxy 510 may collect user input 506 (e.g., a communication/text to be posted on as social media platform, audio data to be sent on an alternative platform (e.g., a website), and/or an image to be posted to one or more system platforms (e.g., social media platform/website). Also, the input proxy 510 may query the anonymity analyzer 520 for insights to the user input 506.

The anonymity analyzer 520 returns a breakdown of the content and which threat exposed to the user 525 (e.g., which portion of the text may reveal personal information, and to which extent considering the content posted previously) such as, for example, personal address/home information that has been disclosed on a social media platform and information about a vacation deemed to potentially generate risk or negative activity/actions such as, for example, a threat.

In one aspect, the anonymity analyzer 520 may analyze, learn and associate all data pertaining to the user 525. The anonymity analyzer 520 may receive all the data from the different extractors, such as, for example, the PI extractors 504A-C, which store data in a knowledge PI storage database 530, which data may be associated with a knowledge-graph and linked data area (e.g., Semantic Web). Using the example of the knowledge graph, the present disclosure may provide an ontology describing what the personal information with the current user data stored in its own graph is. Based on that ontology, the anonymity analyzer 520 may infer as much information as possible while tracking all the PI that the anonymity analyzer 520 was able to link.

In one aspect, the anonymity analyzer 520 may provide a PI assessment 542 to a PI dashboard 540. The PI dashboard 540 may be used to query the anonymity analyzer 520 on the data currently held. The purpose of the PI dashboard 540 is to fetch the PI assessment 542 of the current status, with information on what is exposed, why, and how, such as, for example, home information that has been disclosed on a social media platform while working hours have been disclosed on another website, which data that is coupled together may increase a privacy risk or leakage of private, sensitive data.

Figure 6:
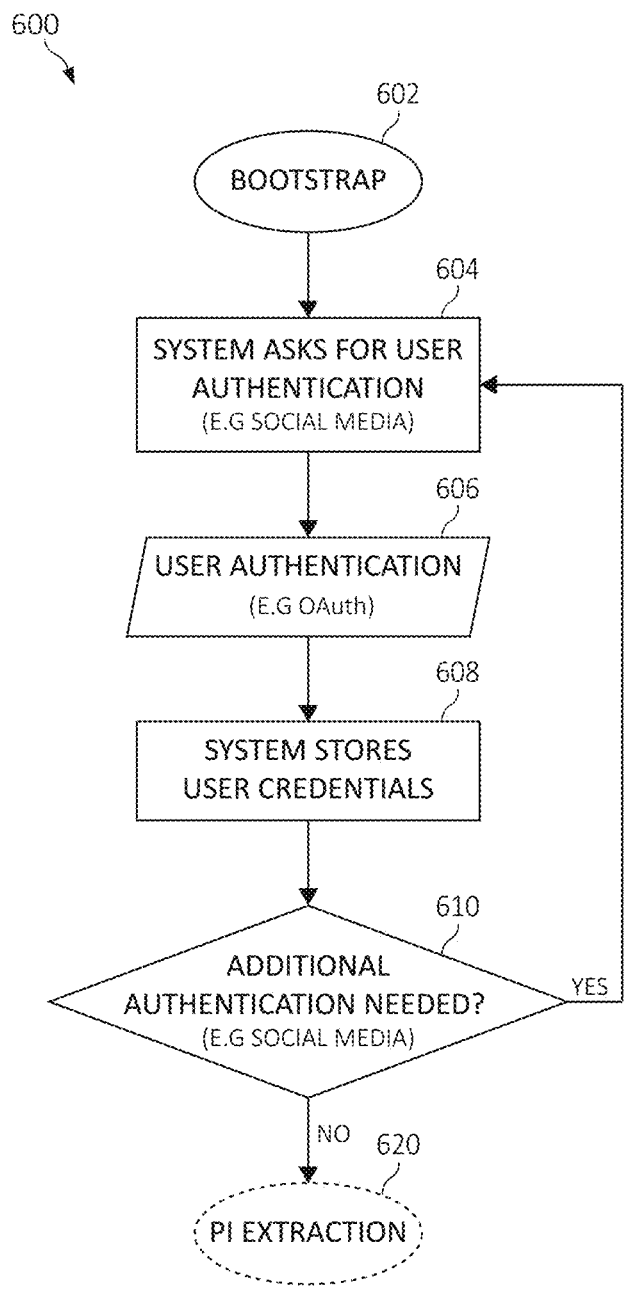
FIG. 6 is a flowchart diagram depicting an exemplary method for providing enhanced data anonymity protection using a bootstrap operation in a computing environment, by a processor, in which aspects of the present disclosure may be realized.

FIG. 6 is a flowchart diagram depicting an exemplary method for providing enhanced data anonymity protection using a bootstrap operation in a computing environment by a processor, in which aspects of the present disclosure may be realized. The functionality 600 may be implemented as a method (e.g., a computer-implemented method) executed as instructions on a machine, where the instructions are included on at least one computer-readable medium or one non-transitory machine-readable storage medium. The functionality 600 may start in block 602.

A query may be issued by a system (e.g., a social media platform) to a user requesting user authentication, as in block 604. A user may then authenticate (e.g., using user credentials such as, for example, "OAuth") with the system, as in block 606. The system (e.g., a social media platform) may store the user credentials, as in block 608. A determination operation is executed to determine whether the additional authentication information is required, as in block 610. If yes, at block 610, the method 600 may move back to block 604. If no at block 610, the method 600 moves to block 620. At block 620, personal information ("PI") data may be extracted, as in block 620.

Figure 7:
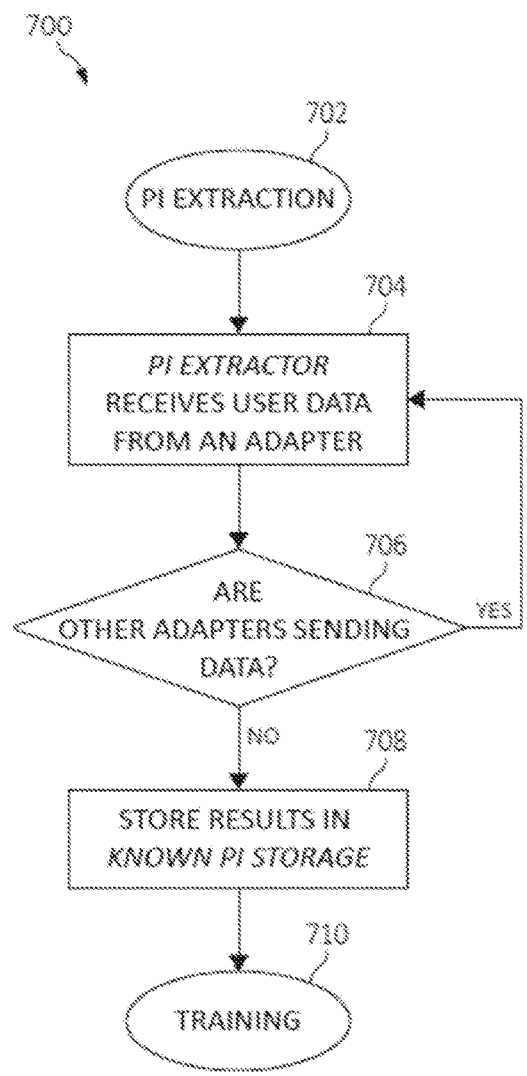
FIG. 7 is a flowchart diagram depicting an exemplary method for providing enhanced data anonymity protection using a personal information ("PI") extraction operation in a computing environment, by a processor, in which aspects of the present disclosure may be realized.

For further explanation, FIG. 7 is a flowchart diagram depicting an exemplary method for providing enhanced data anonymity protection using a personal information ("PI") extraction operation in a computing environment, by a processor, in which aspects of the present disclosure may be realized. The functionality 700 may be implemented as a method (e.g., a computer-implemented method) executed as instructions on a machine, where the instructions are included on at least one computer readable medium or one non-transitory machine-readable storage medium. In some implementations, FIG. 7 is a continuation or subsequent set of operations following the operations of FIG. 6.

The functionality 700 may start in block 702 by extracting the personal information ("PI") data. User data may be received from an adapter component by a PI extractor, as in block 704. A determination operation is executed to determine whether other adaptors are sending data, as in block 706. If yes at block 706, the method 700 may move back to block 704. If no at block 706, the method 700 moves to block 708. At block 708, results may be stored in a storage system (e.g., a database of known personal information). It should be noted that "results" may refer to the fact that all platforms (e.g., social media platforms) may each have their own way of exposing data. A required step is to parse/read all this data and extract all the PI within. Thus, the "results" may refer to the extracted PI, which will be used later on to identify possible leakages. The data may be used to execute a training operations via machine learning, as in block 710.

Figure 8:
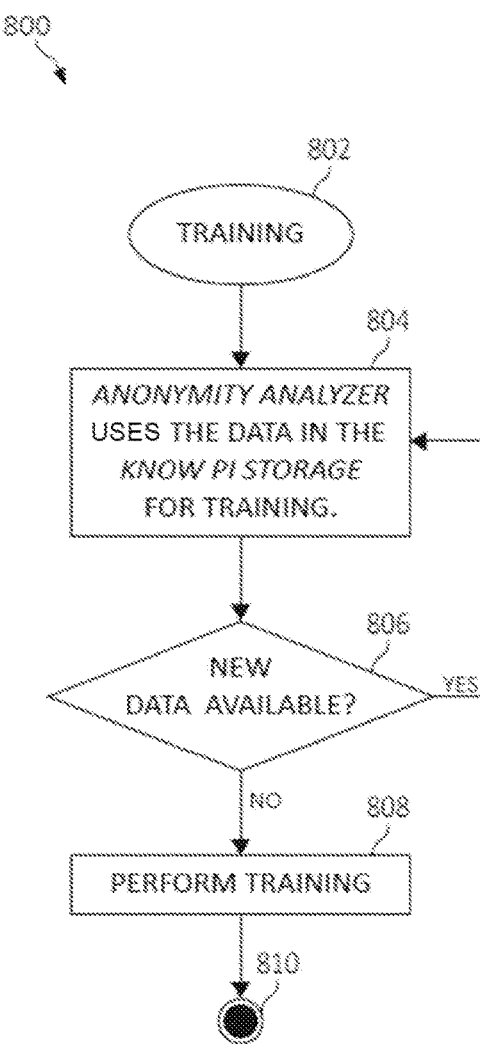
FIG. 8 is a flowchart diagram depicting an exemplary method for providing enhanced data anonymity protection using a training operation in a computing environment, by a processor, in which aspects of the present disclosure may be realized.

FIG. 8 is a flowchart diagram depicting an exemplary method for providing enhanced data anonymity protection using a training operation in a computing environment, by a processor, in which aspects of the present disclosure may be realized. The functionality 800 may be implemented as a method (e.g., a computer-implemented method) executed as instructions on a machine, where the instructions are included on at least one computer readable medium or one non-transitory machine-readable storage medium. The functionality 800 may start in block 802. In some implementations, FIG. 8 is a continuation or subsequent set of operations following the operations of FIG. 7.

The functionality 800 may start in block 802 by executing a training operations via machine learning. The data stored in the storage system (e.g., a database of known personal information of FIG. 7) may be used for training by an anonymity analyzer, as in block 804. A determination operation is executed to determine whether new/additional data is available, as in block 806. If yes at block 806, the method 800 may move back to block 804. If no at block 806, the method 800 moves to block 808. At block 808, a training operations may be performed via machine learning, as in block 808. The method 800 may end, as in block 810.

Figure 9:
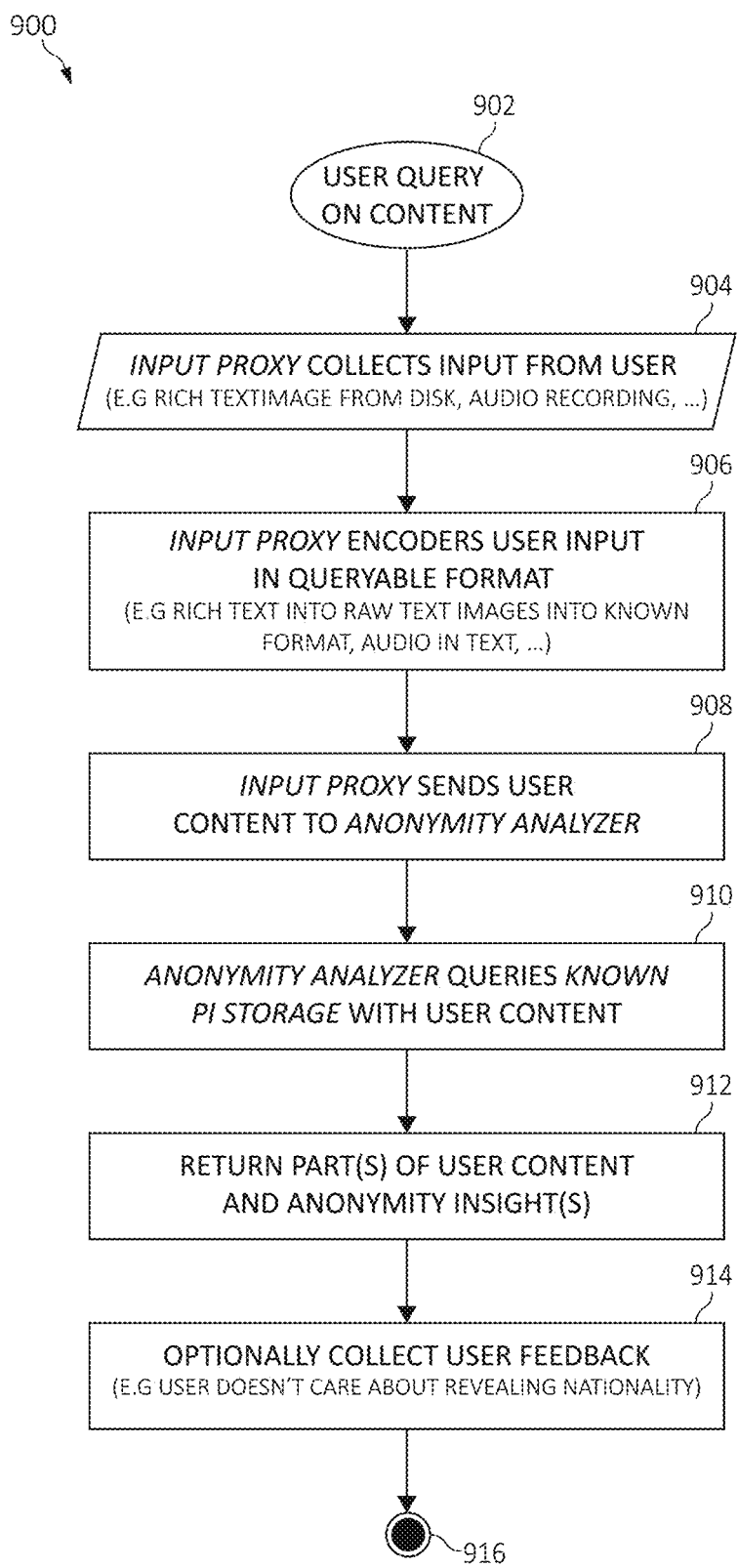
FIG. 9 is a flowchart diagram depicting an exemplary method for providing enhanced data anonymity protection using a query on content operation in a computing environment, by a processor, in which aspects of the present disclosure may be realized.

FIG. 9 is a flowchart diagram depicting an exemplary method for providing enhanced data anonymity protection using a query on content operation in a computing environment, by a processor, in which aspects of the present disclosure may be realized. The functionality 900 may be implemented as a method (e.g., a computer-implemented method) executed as instructions on a machine, where the instructions are included on at least one computer readable medium or one non-transitory machine-readable storage medium. In some implementations, FIG. 9 is a continuation or subsequent set of operations following the operations of FIG. 8.

The functionality 900 may start in in block 902 for executing a user query on content. Input from a user may be collected by an input proxy, as in block 904. The input proxy encodes a user input in a queryable format (e.g., encoding from rich text into raw text, images into a known format, audio into text, etc.), as in block 906. The input proxy sends user content to an anonymity analyzer, as in block 908. The anonymity analyzer queries the known PI storage database with the user content, as in block 910. One or more parts/sections of the user content and anonymity insights may be returned, as in block 912. For example, the "insights" or "parts/sections" may include or be the "insights" or "parts/sections" that are referred to herein as assessment. For example, one possible insight to a user may be a notification that "your post may reveal personal information because of the following reasons . . . ", or "in relation with your previous post-y, it could be possible to identify your country", or anything in that style. As used herein, the word "insight" is used because it could be one of a variety of assessments or text relating to anything pertaining to the user (e.g., text explaining the nature of the issue, a score over multiple dimension, a chart).

In some implementations, user feedback may be collected (e.g., optionally collected), as in block 914 (e.g., a user may provide feedback allowing specific data to be revealed such as, for example, age, nationality, etc.). The method 900 may end, as in block 916.

Figure 10:
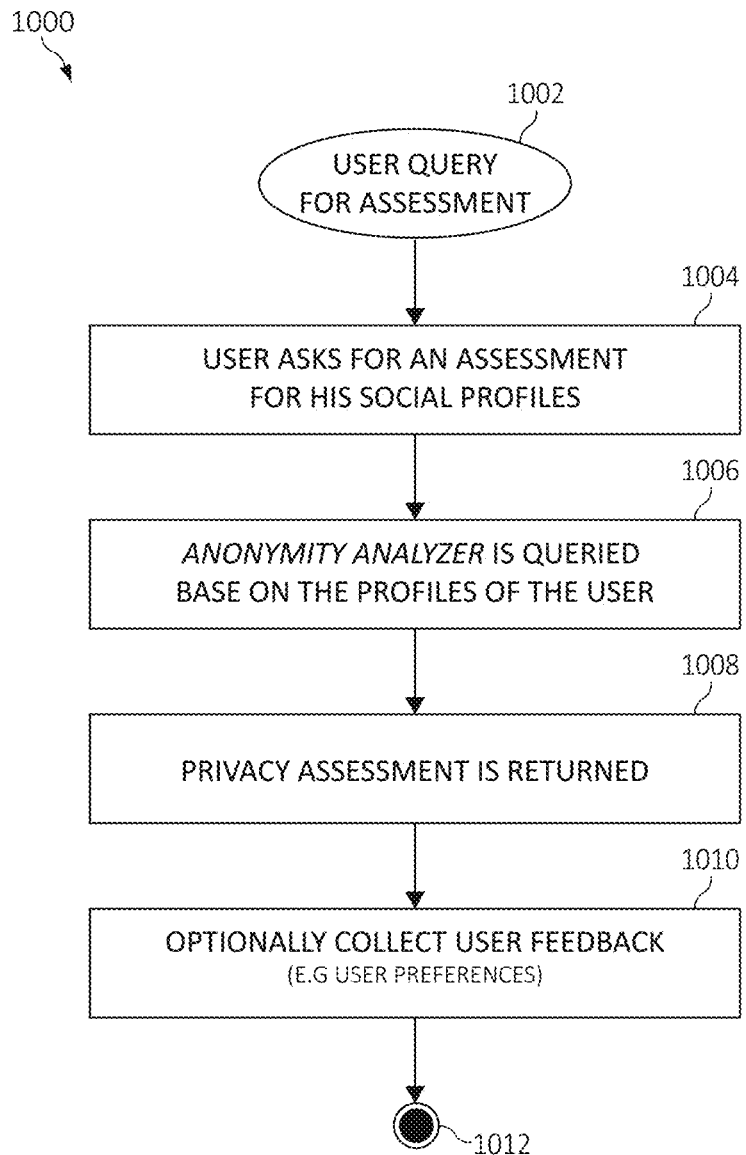
FIG. 10 is a flowchart diagram depicting an exemplary method for providing enhanced data anonymity protection using a user query for assessment operation in a computing environment, by a processor, in which aspects of the present disclosure may be realized.

FIG. 10 is a flowchart diagram depicting an exemplary method for providing enhanced data anonymity protection using a user query for assessment operation in a computing environment, by a processor, in which aspects of the present disclosure may be realized. The functionality 1000 may be implemented as a method (e.g., a computer-implemented method) executed as instructions on a machine, where the instructions are included on at least one computer readable medium or one non-transitory machine-readable storage medium. The functionality 1000 may start in block 1002. In some implementations, FIG. 10 is a continuation or subsequent set of operations following the operations of FIG. 9.

The functionality 1000 may start in in block 1002 for using a user query for assessment operation. A user may query/ask for an assessment of the user's social media platform profiles, as in block 1004. The anonymity analyzer is queried based on the profiles of the user, as in block 1006. A privacy assessment may be provided and returned to the user, as in block 1008. In some implementations, user feedback may be collected (e.g., optionally collected), as in block 1010 (e.g., a user may provide feedback allowing specific data to be revealed such as, for example, age, nationality, etc.). The method 1000 may end, as in block 1012.

Figure 11:
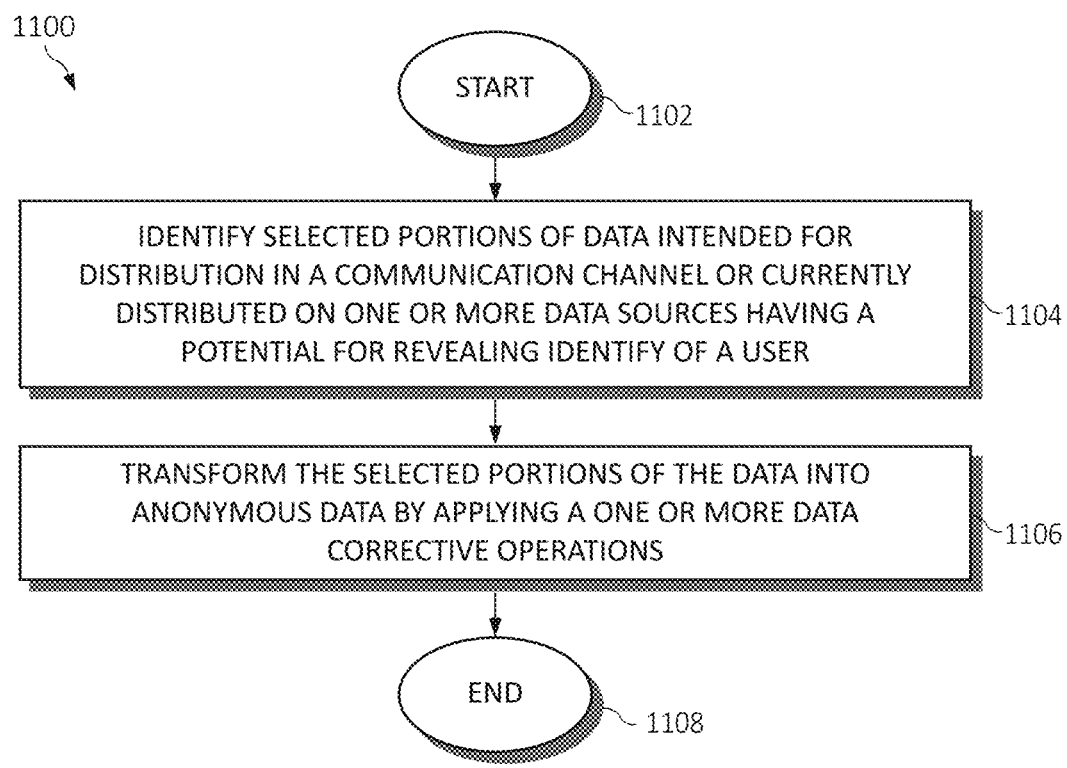
FIG. 11 is a flowchart diagram depicting an exemplary method for providing enhanced data anonymity protection in a computing environment, by a processor, in which aspects of the present disclosure may be realized.

Turning now to FIG. 11, a method 1100 for providing enhanced data anonymity protection in a computing environment using a processor is depicted, in which various aspects of the illustrated embodiments may be implemented. The functionality 1100 may be implemented as a method (e.g., a computer-implemented method) executed as instructions on a machine, where the instructions are included on at least one computer-readable medium or one non-transitory machine-readable storage medium. The functionality 1100 may start in block 1102.

Selected portions of data intended for distribution in a communication channel or currently distributed on one or more data sources having a potential for revealing identify of a user in a public domain may be identified, as in block 1104. Block 1104 may also include providing an assessment is provided indicating a current status of an amount of data currently exposing the identity of the user in the public domain. The selected portions of the data may be transformed into anonymous data by applying a one or more data corrective operations to prevent further exposure of the identity of the user into the public domain, as in block 1106. The functionality 1100 may end, as in block 1108.

In one aspect, in conjunction with and/or as part of at least one blocks of FIG. 11, the operations of method 1100 may include each of the following. The operations of 1100 may generate a report of the data indicating a potential for revealing the identity of the user based on the selected portions of data intended for distribution in the communication channel or currently distributed on the or more data sources. The operations of 1100 may indicate the selected portions of the data intended for distribution in the communication channel exposes the identity of the user.

The operations of 1100 may identify the selected portion of the data reveals the identity of the user based on using a knowledge graph (e.g., using a machine learning operation). The operations of 1100 may apply the one or more data corrective operations to the selected portion of the data intended for distribution in the communication channel or currently distributed on the one or more data sources.

The operations of 1100 may initiate a machine learning operation to identify and learn all data, data attributes, and sensitive data associated with the user from prior communications to one or more communication channels, all data intended for distribution in the communication channel, and all data currently distributed on one or more data sources that exposes the identity of the user. The operations of 1100 may train one or more machine learning models to identify and transform the selected portions of data into the anonymous data according to a user profile.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present disclosure. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by one or more processors, credentials to access a user account for a publicly available social media platform;
parsing, by one or more processors, the user account for the publicly available social media platform, the parsing comprising:
using, by one or more processors, the credentials to access the user account for the publicly available social media platform; and
extracting, by one or more processors, information from the publicly available social media platform using the user account;
responsive to parsing the user account, identifying, by one or more processors, selected portions of data of the information previously posted to the publicly available social media platform as having a potential for revealing an identity of a user;
providing, by one or more processors, an assessment indicating a current status of an amount of data currently exposing the identity of the user by analyzing user profile information posted to the publicly available social media platform; and
transforming, by one or more processors, the selected portions of the data into anonymous data by, subsequent to accessing the user account using the credentials, editing and applying a data corrective operation to the selected portions of the data previously posted to the publicly available social media platform that reduces further exposure of the identity of the user, wherein transforming the selected portions of data into anonymous data comprises modifying the data such that the anonymous data is a more generic version of the data, the modifying the data comprising swapping user country origin with ability to speak a language typically associated with the country.

2. The computer-implemented method of claim 1, further comprising generating, by one or more processors, a report of the data indicating a potential for revealing the identity of the user based on the selected portions of data.

3. The computer-implemented method of claim 1, further comprising indicating, by one or more processors, the selected portions of the data are intended for distribution in a communication channel and expose the identity of the user.

4. The computer-implemented method of claim 1, further comprising identifying, by one or more processors, the selected portion of the data reveals the identity of the user based on using a machine learning operation.

5. The computer-implemented method of claim 1, further comprising initiating, by one or more processors, a machine learning operation to identify and learn: (i) all data, data attributes, and sensitive data associated with the user from prior communications to one or more communication channels, (ii) all data intended for distribution in the communication channel, and (iii) all data currently distributed on one or more data sources that exposes the identity of the user.

6. The computer-implemented method of claim 1, further comprising training, by one or more processors, one or more machine learning models to identify and transform the selected portions of data into the anonymous data according to a user profile.

7. A computer system comprising:
a processor set;
one or more computer readable storage media; and
program instructions stored on the one or more computer readable storage media to cause the processor set to perform operations comprising:
receiving credentials to access a user account for a publicly available social media platform;
parsing the user account for the publicly available social media platform, the parsing comprising:
using the credentials to access the user account for the publicly available social media platform; and
extracting information from the publicly available social media platform using the user account;
responsive to parsing the user account, identifying selected portions of data of the information previously posted to the publicly available social media platform as having a potential for revealing an identity of a user;
providing an assessment indicating a current status of an amount of data currently exposing the identity of the user by analyzing user profile information posted to the publicly available social media platform; and
transforming the selected portions of the data into anonymous data by, subsequent to accessing the user account using the credentials, editing and applying a data corrective operation to the selected portions of the data previously posted to the publicly available social media platform that reduces further exposure of the identity of the user, wherein transforming the selected portions of data into anonymous data comprises modifying the data such that the anonymous data is a more generic version of the data, the modifying the data comprising swapping user country origin with ability to speak a language typically associated with the country.

8. The computer system of claim 7, wherein the operations further comprise generating a report of the data indicating a potential for revealing the identity of the user based on the selected portions of data.

9. The computer system of claim 7, wherein the operations further comprise indicating the selected portions of the data are intended for distribution in a communication channel and expose the identity of the user.

10. The computer system of claim 7, wherein the operations further comprise identifying the selected portion of the data reveals the identity of the user based on using a machine learning operation.

11. The computer system of claim 7, wherein the operations further comprise initiating a machine learning operation to identify and learn: (i) all data, data attributes, and sensitive data associated with the user from prior communications to one or more communication channels, (ii) all data intended for distribution in the communication channel, and (iii) all data currently distributed on one or more data sources that exposes the identity of the user.

12. The computer system of claim 7, wherein the operations further comprise training one or more machine learning models to identify and transform the selected portions of data into the anonymous data according to a user profile.

13. A computer program product comprising:
one or more computer readable hardware storage media;
and program instructions stored on the one or more computer readable storage media to perform operations comprising:
receiving credentials to access a user account for a publicly available social media platform;
parsing the user account for the publicly available social media platform, the parsing comprising:
using the credentials to access the user account for the publicly available social media platform; and
extracting information from the publicly available social media platform using the user account:
responsive to parsing the user account, identifying selected portions of data of the information previously posted to the publicly available social media platform as having a potential for revealing an identity of a user;
providing an assessment indicating a current status of an amount of data currently exposing the identity of the user by analyzing user profile information posted to the publicly available social media platform; and
transforming the selected portions of the data into anonymous data by, subsequent to accessing the user account using the credentials, editing and applying a data corrective operation to the selected portions of the data previously posted to the publicly available social media platform that reduces further exposure of the identity of the user, wherein transforming the selected portions of data into anonymous data comprises modifying the data such that the anonymous data is a more generic version of the data, the modifying the data comprising swapping user country origin with ability to speak a language typically associated with the country.

14. The computer program product of claim 13, wherein the operations further comprise generating a report of the data indicating a potential for revealing the identity of the user based on the selected portions of data.

15. The computer program product of claim 13, wherein the operations further comprise indicating the selected portions of the data are intended for distribution in a communication channel and expose the identity of the user.

16. The computer program product of claim 13, wherein the operations further comprise identifying the selected portion of the data reveals the identity of the user based on using a machine learning operation.

17. The computer program product of claim 13, wherein the operations further comprise:
initiating a machine learning operation to identify and learn: (i) all data, data attributes, and sensitive data associated with the user from prior communications to one or more communication channels, (ii) all data intended for distribution in the communication channel, and (iii) all data currently distributed on one or more data sources that exposes the identity of the user; and
training one or more machine learning models to identify and transform the selected portions of data into the anonymous data according to a user profile.

18. The computer-implemented method of claim 1, wherein the data is currently distributed on the publicly available platform.

\* \* \* \* \*